United States Patent [19]

Marwick

[11] Patent Number: 5,199,671
[45] Date of Patent: Apr. 6, 1993

[54] EXTRATERRESTRIAL TRANSPORTATION APPARATUS AND METHODS

[76] Inventor: Edward F. Marwick, 2516 Partridge La., Northbrook, Ill. 60062

[21] Appl. No.: 642,336

[22] Filed: Aug. 20, 1984

Related U.S. Application Data

[63] Continuation-in-part of Ser. No. 588,711, Mar. 12, 1984, abandoned, which is a continuation-in-part of Ser. No. 137,849, May 7, 1980, Pat. No. 4,436,695, which is a continuation-in-part of Ser. No. 40,849, May 21, 1979, Pat. No. 4,344,913, which is a continuation-in-part of Ser. No. 953,166, Oct. 20, 1978, Pat. No. 4,216,058, which is a continuation-in-part of Ser. No. 810,894, Jun. 28, 1977, Pat. No. 4,121,971.

[51] Int. Cl.$^5$ ............................................. B64G 1/00
[52] U.S. Cl. ................................................. 244/158 R
[58] Field of Search ............... 244/63, 110 D, 110 R, 244/110 E, 113, 158 R, 164, 176, 182; 73/167; 89/8; 310/14; 376/245

[56] References Cited

U.S. PATENT DOCUMENTS

| | | | |
|---|---|---|---|
| 2,224,505 | 12/1940 | Unger | 310/14 |
| 2,395,405 | 2/1946 | Goddard | 244/110 E |
| 2,592,873 | 4/1952 | Driskill | 244/110 E |
| 2,645,279 | 7/1953 | Rossmann | 310/14 |
| 2,812,660 | 11/1957 | Marden et al. | 73/167 |
| 2,813,422 | 11/1957 | Schuessler | 73/167 |
| 2,906,899 | 9/1959 | Geneslay | 310/14 |
| 3,300,744 | 1/1967 | Deutsch | 310/14 |
| 3,527,167 | 9/1970 | Morse | 102/215 |
| 3,678,745 | 7/1972 | Teng | 73/167 |
| 3,718,041 | 2/1973 | Jones et al. | 73/167 |
| 3,940,981 | 3/1976 | Covey et al. | 73/167 |

FOREIGN PATENT DOCUMENTS 316195  11/1919  Fed. Rep. of Germany ........ 73/167

OTHER PUBLICATIONS

Journal of Brit. Interplanetary Soc., vol. 9, No. 6, (27) (11/50) pp. 261-267 Clarke.
7th Conf on Lunar Science, (Mar. 16, 1976) pp. 161-164 "Capture of Lunar Materials Ejected Into Deep Space", Abo-El-Ata.

*Primary Examiner*—Salvatore Cangialosi

[57] ABSTRACT

Greatly reduced costs for the transportation of small cargoes that can withstand extremely high decelerations and of materials from Earth and of lunar materials to a low Earth orbiting satellite is obtained by having such materials and cargoes in a crash-load that collided with much matter within the satellite's very large containing chamber seriatum. Such matter is collected by the use of tether-induced "gravity", by powerful electro-magnets or by other magnetic forces and then such matter is concentrated towards the center of such chambers by the use of catapult-pushers, a very massive tub-pusher, or by magnetic forces produced by large coils which encircle the chamber. Incoming crash-loads are centered along the center-line of such chamber by magnetic forces formed by the use of external coils of decreasing diameter that are along the trajectory of the crash-load before the chamber. The walls of a crash-load containing chamber are protected from damage from flying debris, etc. by the use of a very large and multi-layered chain-sleeve that is a de facto inner wall.

36 Claims, 7 Drawing Sheets

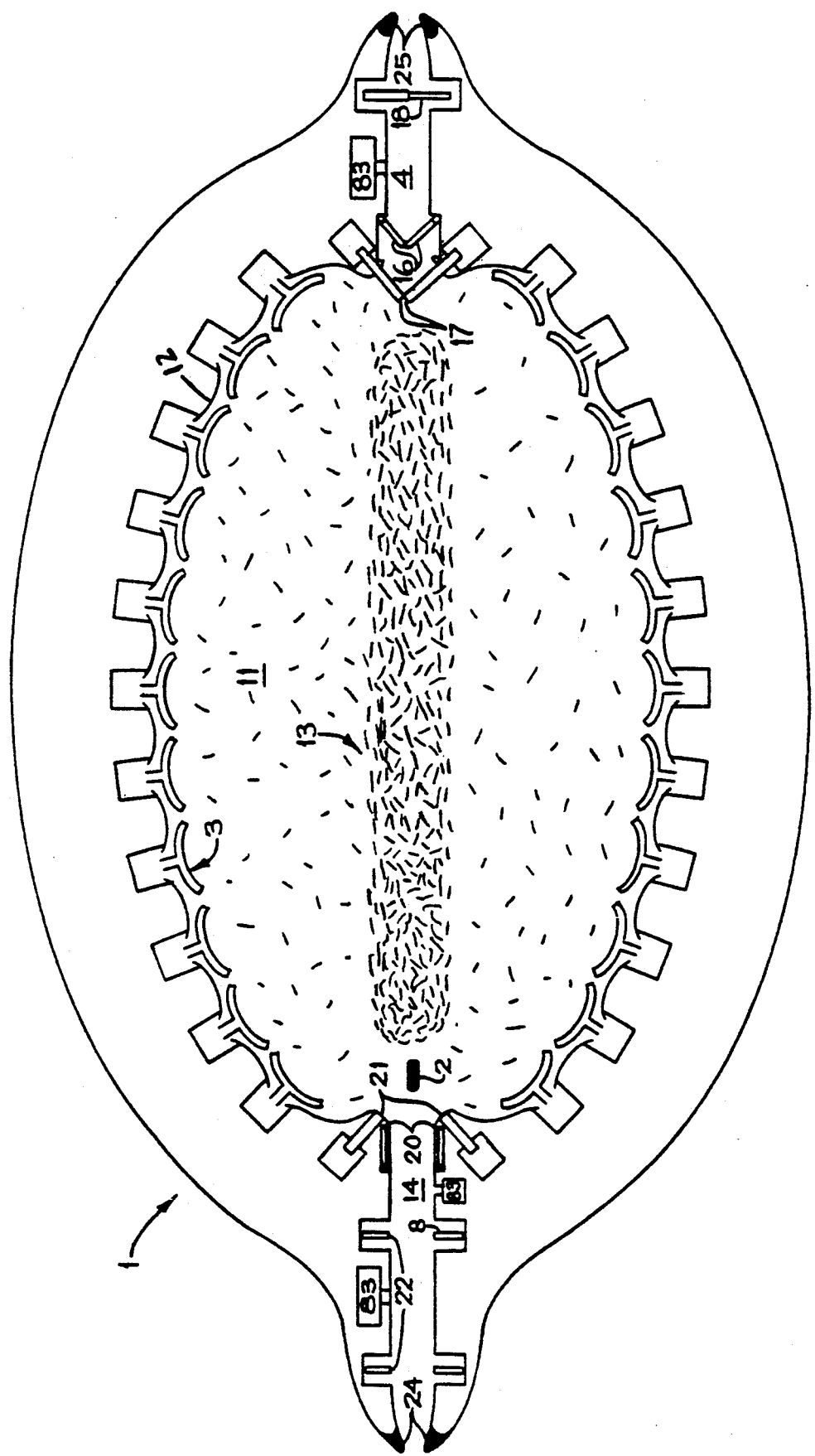
FIG_1

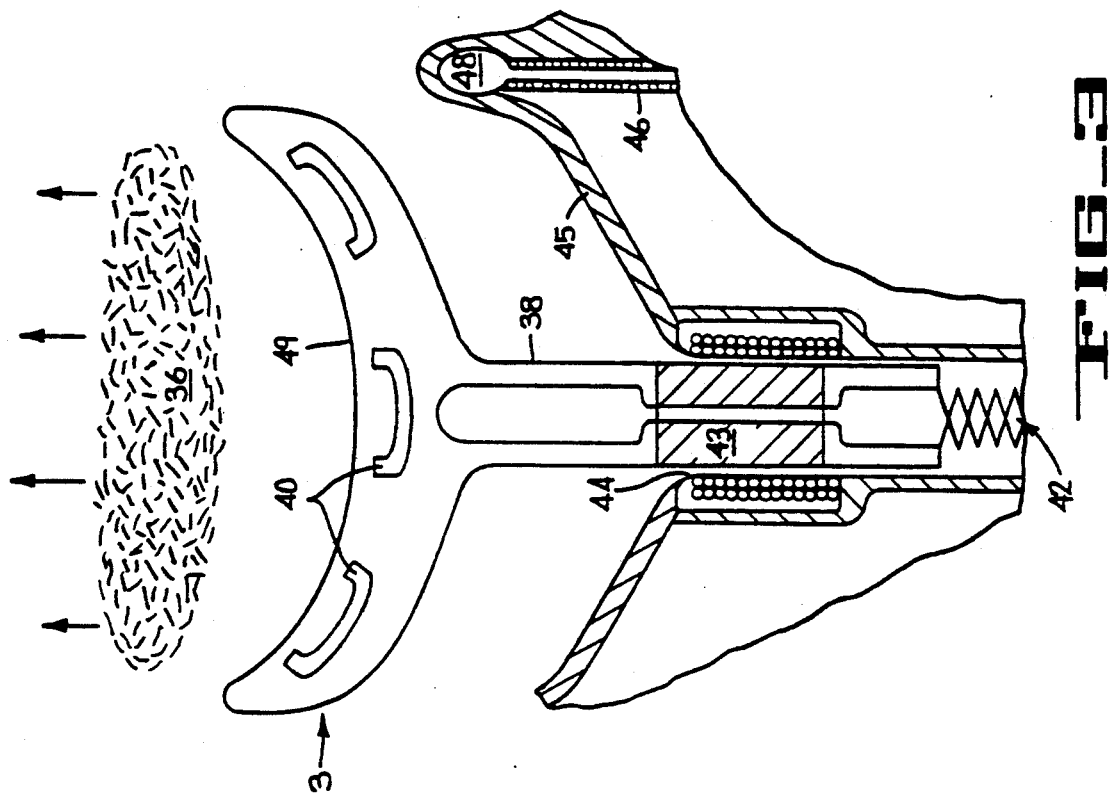

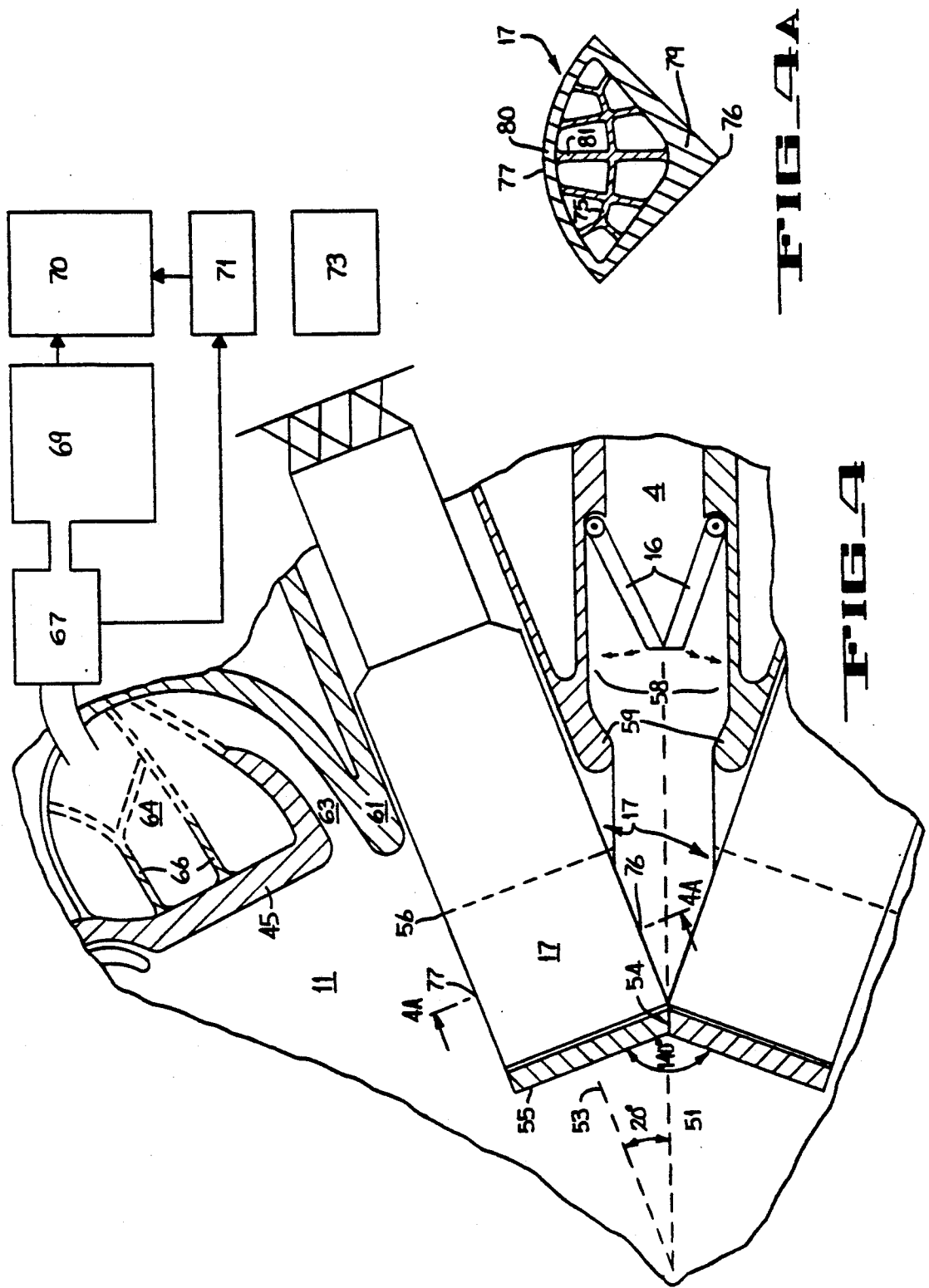

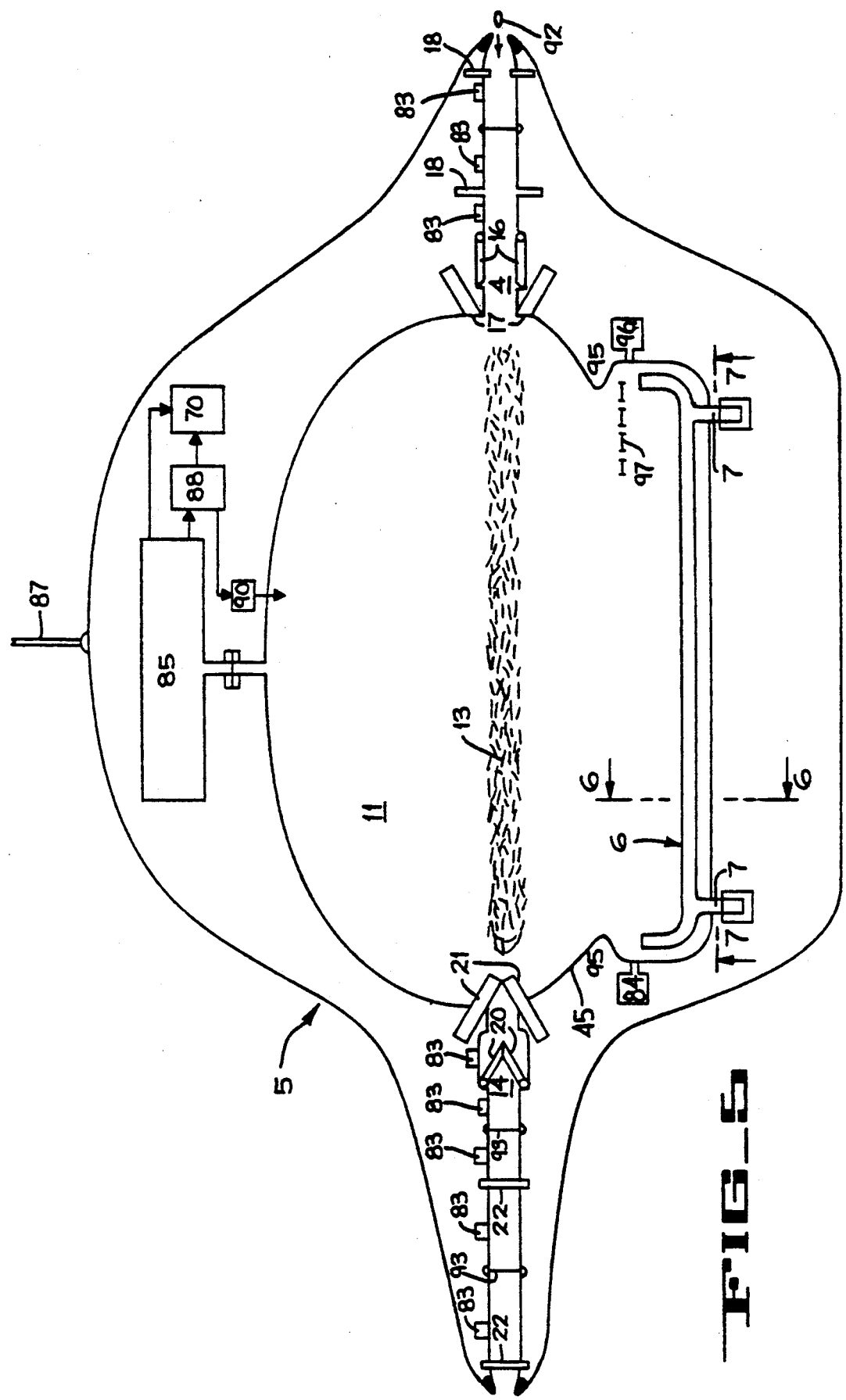

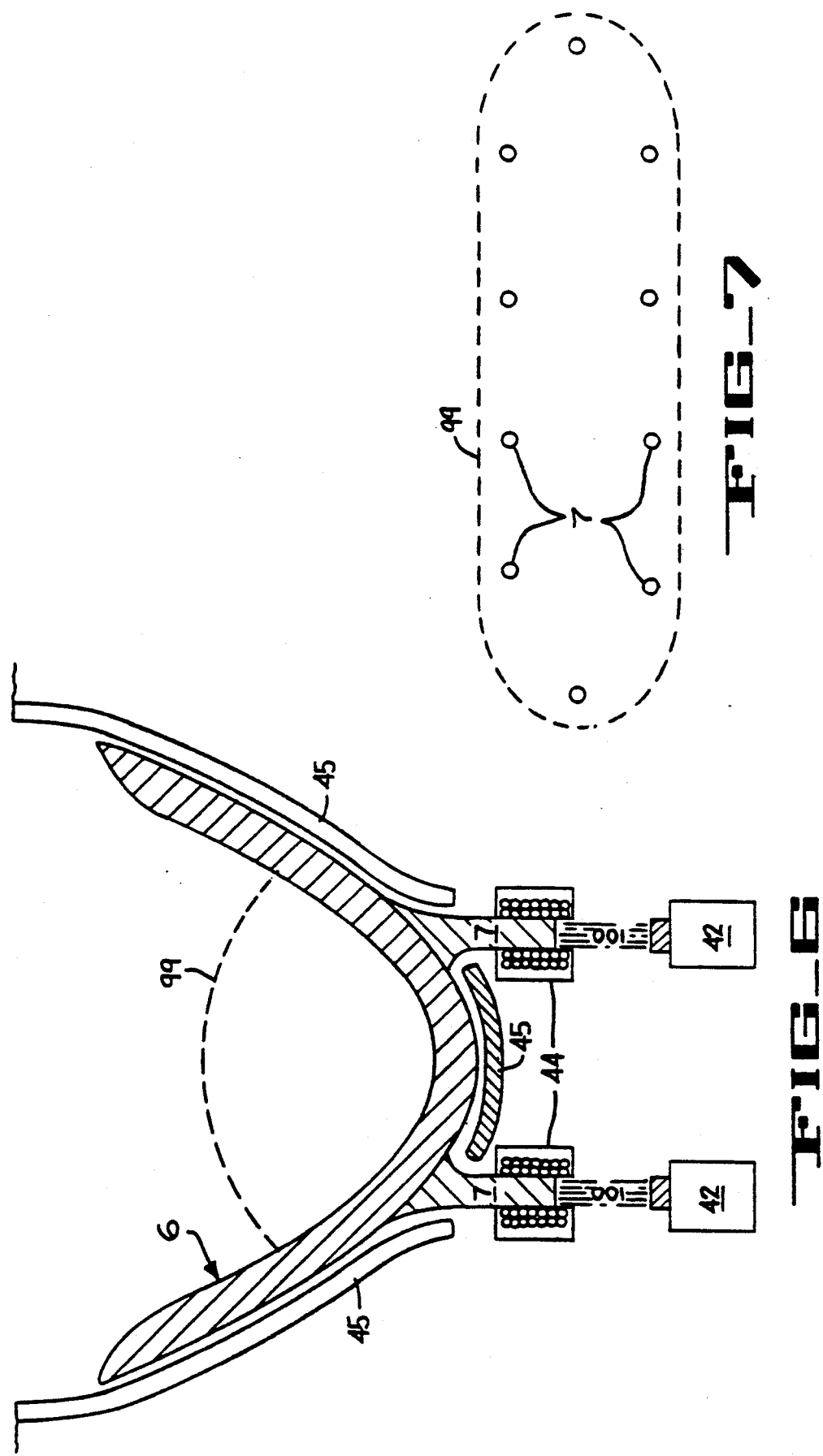

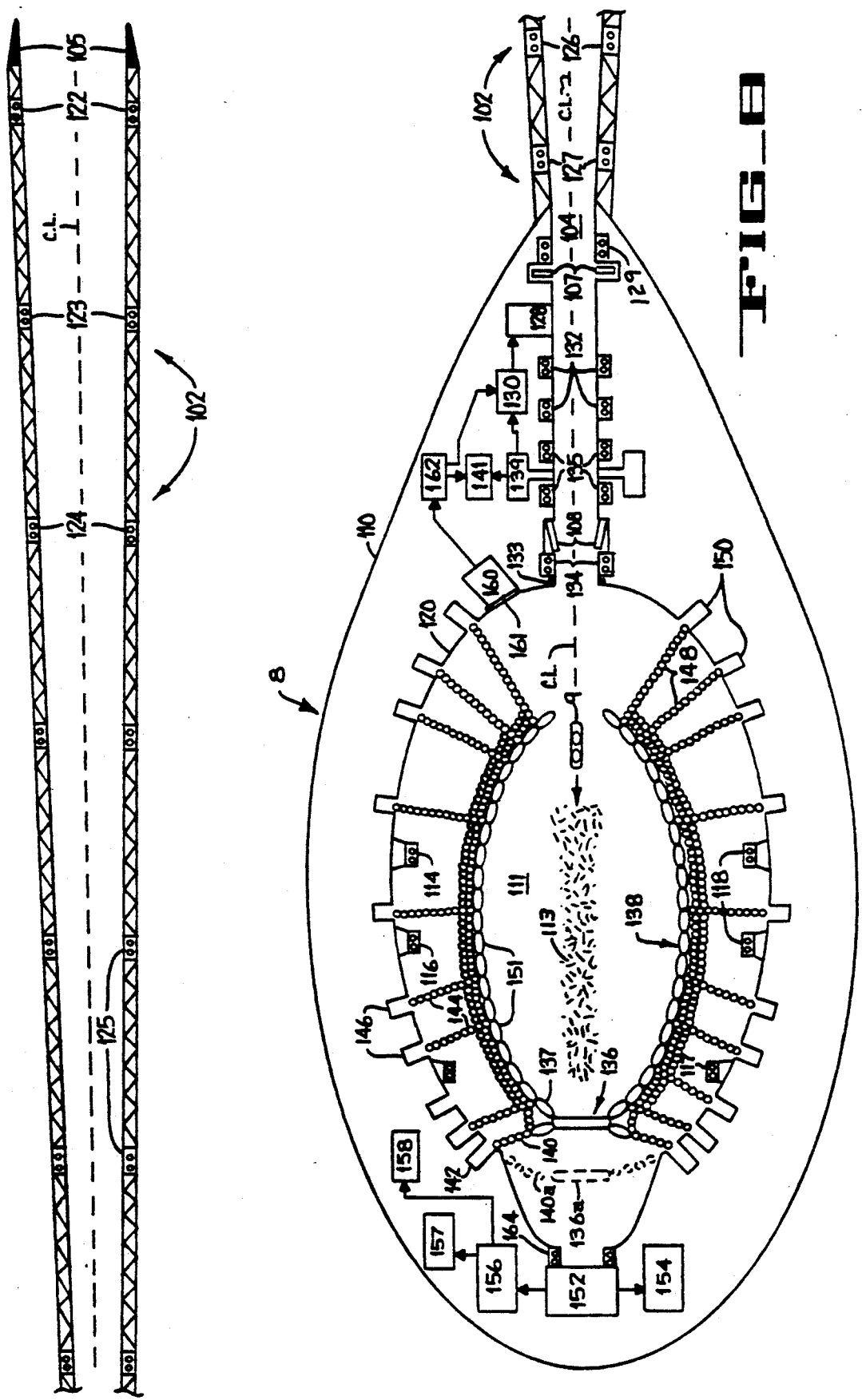

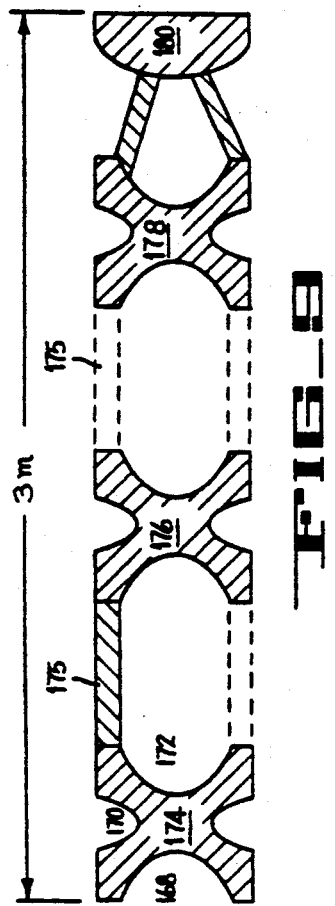
FIG._9
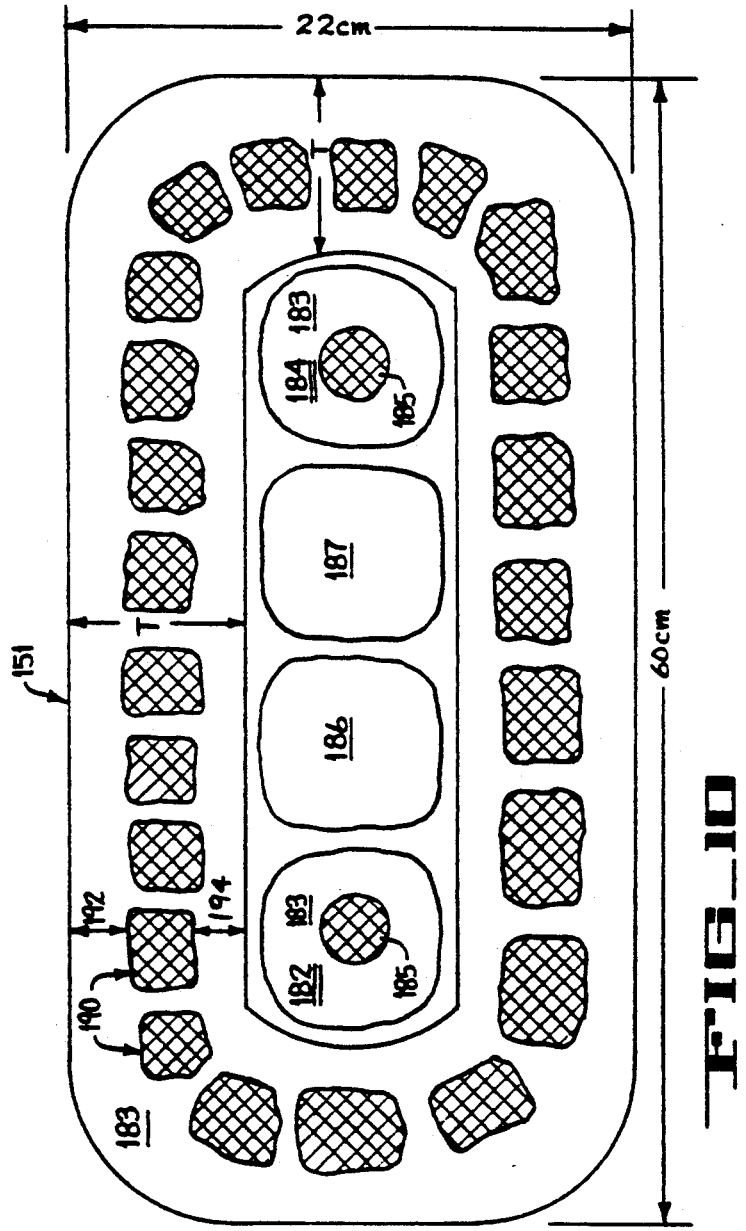
FIG._10

EXTRATERRESTRIAL TRANSPORTATION APPARATUS AND METHODS

This invention is a continuation-in-part of my U.S. patent application Ser. Number 588,711 filed Mar. 12, 1984, now abandoned which is, in turn, a continuation-in-part of my application Ser. No. 137,849 filed May 7, 1980, now U.S. Pat. No. 4,436,695 issued Mar. 13, 1984, which is, in turn, a continuation-in-part of my application Ser. No. 40,849 filed May 21, 1979, now U.S. Pat. No. 4,344,913 issued Aug. 17, 1982, which is, in turn, a continuation-in-part of my application Ser. No. 953,166 filed Oct. 20, 1978, now U.S. Pat. No. 4,216,058 issued Aug. 5, 1980, which is, in turn, a continuation-in-part of my application Ser. No. 810,894 filed Jun. 28, 1977, now U.S. Pat. No. 4,121,971 issued Oct. 24, 1978.

The present invention relates to extraterrestrial transportation of materials and, more particularly to apparatus and method of extraterrestrial transportation which requires much less energy than conventional techniques and hence will result in much lower costs for the transportation of materials from Earth to a low Earth orbiting base. Also, costs for shipping materials from the Moon to such a low Earth orbiting base will be much cheaper. With much lower costs to ship materials to low Earth orbit, it becomes much cheaper to ship supplies and personnel to the Moon. Hence, it will be much cheaper to export materials from the Moon, In accordance with the disclosure of the aforementioned U.S. patent application Ser. No. 588,711 instead of having a shuttle or rocket rise to the altitude of the low Earth orbiting base and that shuttle or rocket also has a high horizontal velocity which matches the velocity of that orbiting base, the rocket with the crash-load just rises straight upward, releases its crash-load and then that rocket falls back to Earth to be recovered and re-used. The total quantity of fuel expended is less than 5% of the fuel that would be needed for a rocket-load or shuttle-load of the same mass. The released crash-load is so positioned that it enters into an opening in a large containing chamber wherein it collides with much material about the chamber's center such that the crash-load's material remains within the chamber and that the chamber's containing walls are undamaged.

Also, lunar material is made into crash-loads which are so directed that they also collide with material within that containing chamber. Since the vector sum of the momenta of the terrestrial and lunar material crash-loads is about zero, the altitude and velocity of the crash-load capturing satellite remains somewhat constant.

In addition, the use of a vertical tether about 100 km from the center of gravity of a complex satellite system was disclosed, as well as another system where the containing chamber is rotating about a center of gravity about 60 meters away with a velocity of 5 meters per second. In both of those examples, there is created within the containing chamber a net downward force of about 0.4 newtons per kilogram of mass that cause the materials from the collision of a crash-load to fall to the bottom of the chamber from where they are collected. To collide with the crash-load materials are either dropped or sprayed into the large crash-load capturing-containing chambers, including very large globs as are described in detail in the aforementioned U.S. Pat. No. 4,436,695.

Also enclosed therein is a "dry" embodiment wherein the crash-load of solid materials impacts into a crash-pile of large scraps that are loosely tied together in a containing chamber having no net downward force. After each collision that crash-pile is re-assembled along chamber's center-line.

The present invention also relates to extraterrestrial transportation and particularly to methods and apparatus whereby materials and cargoes from Earth and materials from the Moon may be transported to a large Earth orbiting satellite. In embodiments of this invention, there is either a very small or a nil net downward force within the large containing chamber and materials are pushed, thrown or caused to move by magnetic forces from the bottom and/or sides of said chambers into a location about the horizontal center-line of said containing chamber.

In a chamber where there is either nil or very low net downward force it becomes very easy to cause large masses to be moved toward the center-line of such chambers for collision with high velocity crash-loads. For example, if 15 newtons of force acts upon a kilogram of mass for a tenth of a second in a location where the "gravity" is but 0.1 meters per second squared (about a centi-gravity) that mass will rise to a maximum height of about 11 meters and be traveling up and down for about 30 seconds. On Earth, with the same force and mass, that mass rises about 0.0026 meters and is back to its starting location in less than a quarter-second. Also the velocity with which such falling objects strike the bottom is dramatically different. For example, on Earth after free-falling some 11 meters, an object has a velocity of about 14.7 meters per second while in centi-gravity after falling some 11 meters the object has a velocity of but 1.47 meters per second.

Likewise, where there is micro-gravity (i.e. virtually no net downward force), a force of milli-newton exerted upon a stationary mass of a kilogram by magnetic means for a period of about 10 seconds will give that mass a velocity of one centimeter per second. In some twenty minutes that mass will have traveled about 12 meters. On Earth such forces of about one ten-thousandth as much as gravity will have nil effect.

A first embodiment of the present invention, the "pusher" embodiment is also a "dry" system where the crash-load containing chamber has no net downward force. Along the major center-line of a somewhat ellipsoidal chamber whose major axis is about twice its minor axes there is formed a debris assembly by the use of a great plurality of debris pushers which push or throw debris inwardly. Much of the debris is ferromagnetic and a high proportion of the crash-loads of lunar material consist of grain-size particles from the lunar soil that have been gathered up by powerful electromagnets and contain mostly iron with some nickel and will be referred to as lin from lunar iron and nickel.

After the incoming crash-load impacts with the debris assembly, the resulting mixture of fragments from the shattered crash-load and of the debris assembly are subjected to magnetic forces produced by powerful electromagnets located along the sides of the crash containing chamber which cause most of the ferromagnetic debris particles with some other materials to be attracted back into those debris pushers.

In a second or "tub" embodiment of this invention, there is a net downward force of about 0.1 newton per kilogram of mass which is caused by the use of a vertical tether with a length of about 25 km from the center of gravity of a satellite system which has also an upper mass assemblage where there is a net upward force. In very low Earth orbit, the net force with a vertical tether is equal to about 0.004 newtons per kilogram of mass for every kilometer of length from the center of gravity.

In such a vertical satellite system with two large mass-assemblages, it is probably best that the large crash-load capturing-containing chamber be located in the bottom assemblage because it is easier (cheaper in fuel expended, etc.) to crash-load from Earth to a lower altitude. There is much less atmospheric drag on the upper mass assemblage hence bulky mirrors and solar collecting facilities are best located there. Also, the higher the altitude the lower the percentage of time that such solar energy collecting devices are in the Earth's shadow.

In the "tub" embodiment, the debris assembly is placed along the major center-line of the containing chamber by being pushed or thrown up there by a very large and long tub located at the chamber's bottom. After the crash, the debris falls back into the tub to be used for the next debris assembly.

Both the "pusher" and "tub" embodiments of this invention preferably have two opposite end openings for crash-loads. Crash-loads from Earth enter through the forward entrance of the chamber and crash-loads of lunar material enter through the chamber's rear entrance. Terrestrial crash-loads are de facto retro-grade and the crash-loads of lunar materials are prograde. When the vector sum of the momenta of crash-loads captured equals zero, there is no resulting change in the satellite system's altitude or orbital velocity. A slightly larger momentum from lunar crash-loads could compensate for atmospheric drag.

The crash-load capturing system in the "pusher" embodiment is designed to capture and contain solid materials, such as lin and lunar soil, from the Moon and materials such as thick tar, plastics, and aluminum alloys from the Earth. The "tub" embodiment is also designed to handle crash-loads that contain water or cryogenic materials, such as ammonia, methane and hydrogen which vaporize upon impact with the debris assemblies.

With the industrialization of space, there will need to be imported from Earth many materials which are not or will not be found in recoverable quantities on the moon or on convenient asteroids. The quantities of such special materials are so small compared to the total mass of materials being shipped by crash-loads that to have such special materials mixed with all the debris would make the recovery of such special materials most difficult and very costly. Such special material could include copper, chromium, tungsten, chlorine, etc., and other special chemicals and metals.

Such special materials could be transported by crash-loads as special ellipsoidals which retain their shape and integrity during and after the crashings and are easily recovered from the debris. Such ellipsoidals have a strong outer shell and could have equal major and minor diameters (a sphere) or could have major diameters that are as much as 50% greater than the minor diameter. The volume of ellipsoids varies between 10 ml and 10 liters and they could be homogeneous of say brass or they could be constructed of a strong and thick outer shell of a very tough metal such as tungsten, molybdenum, vanadium or chromium while the inside contains special materials or chemicals such as germanium tetra-fluoride, lithium hydride or silver solder The ellipsoidals containing such special materials preferably are so packaged within a crash-load that the other cargo of the crash-load acts to cushion the ellipsoidals. For example, with the "weightless" embodiment, the ellipsoidal is preferably surrounded by and mostly behind several times its own weight of very thick tar. In the "tub" embodiment, the ellipsoidals are within preferably cold volatile material such as solid ammonia.

The third or orbital transport (OTV) vehicle embodiment of this invention is, like the "pusher" embodiment a "dry" and "weightless" crash-load capturing satellite. However, this orbital transport vehicle has but one entryway and captures only crash-loads of mostly lin, and is designed to slowly transport cargoes from very low Earth orbit to higher Earth orbits. Such an orbital transport vehicle could also slowly transport cargoes from very low Earth orbit in the plane of the Earth's equator to a higher Earth orbit that is inclined to the plane of the Earth's equator as well as to very high Earth orbits that are higher than geo-stationary orbit. Note that such a very high Earth orbit will be exposed to less deadly radiations than geo-stationary orbit. Such a very high Earth orbit or geo-stationary orbit might be the location of a large facility wherein the almost continuous supply of solar radiation is used for power.

For the return of this orbital transport vehicle to very low Earth orbit it crash-captures retrograde crash-loads of much lin. Different masses of such retrograde crash-loads are used since the closer to Earth the higher the velocity, nearest Earth the loads are about 30 kg while about geo-stationary orbit the loads are about 70 kg. Likewise the prograde crash-loads have higher velocity nearer Earth and hence nearest Earth the load has a mass of about 200 kg while beyond geo-stationary orbit the load's mass is about 460 kg.

In the orbital transport vehicle embodiment, the debris assembly is placed along the center-line and trajectory-path of the crash-load by powerful magnetic fields produced by giant coils which substantially surround the large crash-containment chamber.

In this OTV embodiment there is disclosed the concept of centering an on-coming crash-load into a trajectory that is very close to the center-line of the satellite's entryway and crash-load capturing chamber. There are coils of ever larger diameter that are progressively farther and farther from the entryway. As a crash-load approaches the outermost coil, over a hundred meters from the entryway, an intense current pulse is programmed through that coil. Magnetic forces are formed which push that crash-load, which has much ferromagnetic material (i.e. lin), toward the center-line. Likewise, later pulses through other coils cause the crash-load to be further centered. Because of such crash-load centering, the practitioner of this invention could design a passageway with a smaller diameter and with smaller shutters that are quicker acting. Also there is greater certainty that the crash-loads will impact into the center portions of the crash-assembly in the crash-load capturing chamber.

Similarly, much larger coils with greater and longer pulses of current are used to get ferromagnetic particles and pieces into a desired crash-assembly about and along the center-line and towards the center of the containing chamber.

A plurality of such coils that circle the containing chamber and the programmed pulsing of currents within selected coils are disclosed with the resulting desired movement of such ferromagnetic items.

Also disclosed is the use of a multi-layered chain-sleeve that is a de facto inner wall that protects the crash-load capturing chamber's walls from damage caused by high velocity debris. Chains connect the chain-sleeve to the walls and to a massive shield at the far end of the chain-sleeve. A great high-velocity avalanche from the crash-load impacting into the crash-assembly strikes that shield and causes the shield and chain-sleeve to be moved several meters. Since the chains that connect the chain-sleeve and shield to the chamber's walls can be pulled, released, and let out, and hence the chains, chain-sleeve, and shield act as a massive shock-absorber for the crash-load impactations. Magnetic forces and selected chain-pulling are used to prepare the chamber for the next crash-load.

Possibly the industrialization and colonization of Space will follow these five transportation phases in the next quarter century:
1. Develop such facilities, bases and vehicles etc. that the "pusher" embodiment of this present invention is built and ready for operation.
2. The "pusher" embodiment of this present invention is operated and more facilities and vehicles are built and with crash-transported materials from Earth and Moon. Specifically the orbital transport vehicle and the tub embodiments of this present invention are built mostly by use of such "crash" transported materials.
3. There is a great increase of "extraterrestrialization" and a much larger crash-load capturing satellite that uses a slurry as the "debris assembly" is built.
4. The larger crash-load capturing satellite is operational and many much larger ellipsoidals are collected from the draining slurry. Some compressed powdered dehydrated food is transported from Earth via such ellipsoidals. Also ellipsoidals containing lunar nickel, cobalt, and platinum metals are "crashportated".
5. With ever-increasing space industrialization and development, it could be expected that the next big step in space transportation includes the use of linear generators and motors such as the ideas of Roger Arnold and Donald Kingsbury as expressed in their two part article, *Spaceport*, published in the magazine Analog (November and December 1979).

A better understanding of this present invention will be gained when the following detailed description is read in conjunction with the appended drawings, wherein:

FIG. 1 is a generally schematic cross-sectional view along the center-line of an Earth orbiting satellite of the invention.

FIG. 2 is a generally schematic cross-sectional view along the center-line of a crash-load of this invention.

FIG. 3 is a generally schematic cross-sectional view along the center-line of a pusher 3 of the satellite of FIG. 1.

FIG. 4 is a generally schematic cross-sectional view of an entryway and bumper-doors of FIG. 1.

FIG. 4A is a cross-sectional view taken generally along the line 4A—4A of FIG. 4.

FIG. 5 is a generally schematic cross-sectional view along the center-line of an Earth orbiting satellite of a second embodiment of this invention.

FIG. 6 is a cross-sectional view taken along the line 6—6 of FIG. 5.

FIG. 7 is a cross-sectional view along the line 7—7 of FIG. 5.

FIG. 8 is a generally schematic cross-sectional view of an orbital transport vehicle of this invention.

FIG. 9 is a generally schematic cross-sectional view of the crash-load 9 of FIG. 8.

FIG. 10 is a generally schematic cross-sectional view of link 151 of FIG. 8.

Referring now to FIG. 1 an Earth orbiting satellite 1 comprising the "pusher" embodiment of this invention is illustrated at the moment just before a crash-load 2 from Earth collides with a debris assembly 13 within a large containing chamber 11 which is somewhat ellipsoidal in shape with a minor diameter of about 10 meters and a major diameter of about 20 meters. The debris assembly 13 which is located along and about the major axis or center-line of the chamber 11 is formed by debris which is pushed there by a great plurality of pushers 3 located along the wall 12 of the chamber 11.

The crash-load 2 of terrestrial cargo is shown entering through the longer entryway 14 while a shorter entryway 4 at the opposite end of the chamber is double sealed shut with strong doors 16 and shutters 18. In the longer entryway 14, corresponding strong doors 20 and bumper doors 21 are open wide as are the two sets of shutters 22. In addition to those doors and shutters thin membrane disposable shutters (not shown) could be used.

The gas pressure existing an instant after the crashing of a crash-load within the chamber 11 depends upon the nature of the materials used in the debris assembly and the materials of the crash-load. Although this embodiment uses "dry" solid materials, the shock and high localized heating of a crash could produce some vaporization. For example, if the debris assembly and/or the crash-load contains hydroxides, the crashing could produce some water vapor. Likewise, if there is much plastic or heavy tar material with an empirical formula of about $CH_2$, there could be the formation and vaporization of smaller hydrocarbons and perhaps some hydrogen gas. The quantity of vapors and gases produced is also dependent upon the relative velocity of the crash-load. For example, a retrograde crash-load of 30 kg with a relative velocity in excess of 18 km/sec will probably produce more vapors than a prograde crash-load of 460 kg with a relative velocity of about 3.2 km/sec.

However, the vapor and/or gas pressure so produced will total, at the most, a few millimeters of mercury. Such gas and/or vapor may be vented after the crash so that at the instant that the doors and shutter are opened for the next on-coming crash-load, the pressure within the chamber 11 is less than a hundred microns of mercury.

One reason for providing two shutters 22 in the entryway 14 and making it longer than entryway 4, which has but one shutter 18, is because crash-loads from Earth my contain hydroxides and/or hydrocarbons and have about 2.3 times the velocity of lunar material crash-loads. For the same reason, bumpers 24 at the outside entrance of the longer entryway 14 are made heavier and stronger than corresponding bumpers 25 at the outside entrance of the shorter entryway 4. Be it understood that the practitioner of this embodiment can practice great leeway in his use of shutters, doors, length of entryways, and in gas and vapor removing means. It is mainly intended to obtain the minimal loss of material after crash-load crashes with the debris assembly of the satellite 1 at the least practicable expense.

Although there could be a great variety of crash-loads fed into this satellite 1 from Earth and of lunar materials from the Moon, one example of the possible mixtures of crash-loads is as follows:

From Earth mostly plastics-tar ($CH_2$) with aluminum scrap and the materials from rocket motors, fuel tanks and casings. And an ellipsoidal portion containing chromium and lithium hydride and some spheroids of brass.

From the Moon, beneficiated lunar soil and lin. That beneficiated lunar soil contains over 40% oxygen and such soil may be processed into oxygen for use as rocket fuel. Silicon and metals could be used for construction, reaction-mass, or for radiation shielding. The plastic-tar could be processed into rocket fuel. Such fuels could be used in the orbital transport vehicles that supply the communication satellites in geosynchronous orbit and that ship supplies to far Earth orbiting bases.

The debris assembly consists essentially of the debris from such crash-loads although at the beginning it could be a mixture of ground-up spent rockets and fuel tanks and of lin. Logic indicates that it would be cheaper that much of the material needed for the construction of the first satellite built of this embodiment come from the Moon. That is especially true if recoverable water (in forms of hydrates and permafrost) is found in the lunar polar regions, and such "debris" might be somewhat "manufactured". For example, a piece of lin with an order of magnitude volume of a cubic centimeter is wrapped with thinned aluminum alloy scraps and then compressed so that the "manufactured" piece of "debris" will hold together and contain about 10% to 20% ferromagnetic material.

Note that the debris assembly 13 will tend to be denser opposite the entryway last used. For example, if the previous crash-load entered through the entryway 4, the resulting crashing would cause much debris to be moved towards the entryway 14 and collect in the pushers 3 nearby. After the crash-load 2 has crashed, much of the debris will be moved towards the entryway 4. Thus, the center of mass of the debris assembly will be moved back and forth as there are alternate crash-loads of terrestrial and lunar materials.

If there are consecutive crash-loads entering through the same entryway, the debris could be moved towards the entryway by the selective use of the powerful electromagnets. Some of the pushers near the closed entryway could push their debris towards the center-line and then those powerful electromagnets towards the other end could attract ferromagnetic debris towards the entryway that will be opening. Such procedure would be used if this satellite of this "pusher" embodiment is used as a variable Earth orbiting satellite transport vehicle which uses a series of prograde on retrograde crashes to produce vertical motion of the satellite for transport purposes. Such a satellite is disclosed in my application Ser. No. 588,711.

The practitioner of this embodiment could elect to use a reuseable crash-load launcher from Earth that almost places the adjusting rocket and crash-load into the desired trajectory. In such a system adjusting rocket and crash-load containing shell could be about say 10% of the "crash-load" entering the satellite 1. Also, the practitioner might elect to use a less powerful launcher and have the adjusting rocket expend more fuel. In that system perhaps about 15% of the "crash-load" entering satellite 1 is of the larger adjusting rocket, empty fuel containers and of crash-load containing shell.

FIG. 2 the crash-load 2 which preferably enters the entryway 4 rear-first. The reason why this crash-load 2 enters the entryway 4 rear-first is because the spent rocket portion 34 and containing shell thereof is about 40% of the mass of the total "crash-load" of about 200 kg. Although there are many possible systems of rockets that could be used, a typical system could blast off the surface of Earth with a gross mass of about 800 kg of which about 600 kg is rocket fuel. Entering rear-first, there is about 60 kg of solid spent rocket motors and fuel storage facilities 34 "in front" of the main crash-load much of which is of softer material.

Within the main crash-load, which mostly consists of very thick tar 27, is an ellipsoidal portion 26 which has a total mass of about 5 kg. When the rear-first crash-load strikes the debris assembly, the momentum of that ellipsoidal portion causes it to move forward through the thick tar as the crash-load proper is very quickly decelerated by collision with the debris assembly. Even though the debris assembly that is within a meter of the chamber's center-line has a mass on the order of a hundred metric tons (tonnes) rough calculations indicate that over ten tonnes of debris will strike the doors 17 with an average velocity in excess of 200 meters per second All the crash-loads of this invention are designed to shatter as they strike a debris assembly but the ellipsoidal portion 26 retains its structural integrity. The ellipsoidal portion 26 has a thick shell 28 of chromium metal and a center portion 30 with a mass of about 2 kg of LiH. Note that the LiH is loosely packed with a plurality of voids 31. for the retention of hydrogen gas that might be produced by the shock of collisions and of heat produced therefrom. The reason for the ellipsoidal containing chromium, lithium, and hydrogen is because that it is unlikely that recoverable quantities of chromium or lithium will be found on the Moon, the moons of Mars, or on convenient asteroids. Chromium will be needed for use in alloys used in the development of space (extraterrestrialization). Lithium could be used as a getter of hydrogen or to form somewhat delinquescent lithium hydroxide. Also lithium hydroxide can be used as a getter of carbon dioxide. Hydrogen is usable as a fuel. Note that on a weight basis LiH, yields about 14% more hydrogen than does water.

Also shown are two spheroids of brass 32 each of which has a mass of about a kilogram. The brass could be mostly copper with both zinc and tin. When collected from the debris those spheroids could b processed for those three metals all of which are not expected to be found extraterrestrially in recoverable quantities and all have many uses that would be most helpful in the industrialization of space.

The rocket motor(s) and the fuel containment means 34 of the crash-load and rocket 2 are shown as a schematic box 34 as any appropriate rocket system could be used. However, it is very important that there be most precise rocket control means for it is desired that the final trajectory of the crash-load lie within a few centimeters of the satellite 1's center-line of the chamber 11. Note that the crash-load and rocket should have a disposable radio receiving means as well as rocket motor control means so that trajectory control can be provided first from the launch site and then from the satellite.

The design of the crash-load of lunar material is much simpler since there is no atmosphere to pass through. Also the control is less critical because of the much lower relative velocity and of the much longer time during which the crash-load travels from when the crash-load is launched to when it "crashes". That is more than 4 days compared to about 4 minutes. However, care should be taken so that the crash-load of lunar material is not made too strong or is shaped with "streamlining" else it could travel through the debris assembly and still have too much velocity when it strikes the bumper doors 21. To avoid such possible damage to the chamber the crash-load and rocket should be designed to shatter upon striking the debris assembly.

The crash-load and rocket of lunar material which has a total mass upon entering the entryway 4 of about 460 kg and may be similar in design to the crash-load 2 of FIG. 2. In my application Ser. No. 588,711, I disclose the use of an adjuster rocket that burns liquid fuels such as $N_2H_4$ with $N_2O_4$ and blasts away from the trajectory of the crash-load just prior to when the crash-load enters into the crash-load capturing chamber. The reuseable adjuster continues on its most highly elliptical orbit and returned to a very high Earth orbiting base, the whole trip taking several weeks. Such a system may also be used.

Referring to FIG. 3, a pusher 3 is shown at its maximum extension and with the debris 36 traveling toward the center-line. The pusher 3 preferably has a maximum width of about 2 meters and is shaped somewhat like a modified hexagonal bird bath with a column-shaft 38 that has a diameter of about 50 cm.

The pusher 3 is a designed to propel debris toward the centerline of the chamber at a selected time and may use any convenient means of propulsion. In the preferred embodiment, An electric motor (not shown) engages an end portion of column shaft 38 over a period of many minutes to draw back and set a spring system which is released at the desired time. It seems that the best way to stop the pusher moving inwardly and to bring it quickly back to a position less than a centimeter from the chamber 11's wall is to have a spring system 42 attached thereto.

Magnetic coils 44 within the pusher 3 as energized to cause the whole pusher 3 to be quickly moved upwardly since when the pusher is sitting on the wall 45 the magnetic iron portion 43 is mostly below the coils 44. Hence, when the coils 44 are powerfully energized, the pusher 3 quickly moves upwardly. The debris 36 continues moving inwardly when the pusher 3 starts to decelerate because local electromagnets 40 which help to attract and hold debris are have been turned off.

A plurality of powerful electromagnets 48 having coils 46 are turned off all of the time except for a period about a few minutes after a crashing when the velocities of the particles of debris have been reduced to less than a centimeter per second by repeated collisions with each other and with the pushers and walls 45. Then for a period of a few minutes the powerful electromagnets 48 are selectively turned on full power so as to attract the ferromagnetic debris particles toward the pushers. The powerful electromagnets 48 give such particles velocities toward the innermost pole and then when such powerful electromagnet is turned off, said particles are moving toward the powerful electromagnets 48 which are surrounded by pushers 3. Then the local electromagnets 40 are energized and most of those ferromagnetic debris particles are attracted to a location within a pusher 3. As such particles are moving toward the pushers, they collide with non-ferromagnetic particles which then also are somewhat directed toward such pushers 3 and are "collected" within such pushers by being "surrounded" by ferromagnetic material.

Probably a large fraction of non-ferromagnetic material will be a thick tar that has very high adhesive properties towards both such non-ferromagnetic materials as delinized lunar soil and towards ferromagnetic lin particles. Thus, there will be larger "particles" that are conglomerates of tar, lin, and non-ferromagnetic materials. Such larger "particles" will be attracted by the powerful electromagnets 48 and end up in the pushers 3.

At a desired instant, the coils 44 are energized and the portion 43 which is below the coils 44 are accelerated upwardly and which it the whole pusher 3 and the debris 36 that is attached to the inner surface 49 of the pusher 3 by the local electromagnets which are then turned off. When the pusher is about a half meter below where it is shown in FIG. 3, the coils 44 are de-energized but the momentum of the pusher continues inwardly. Over a period of several deciseconds, the spring system 42 decelerates the pusher 3 while the debris continues inwardly. Note that the adhesive forces the debris towards the surface 49 is much less than the forces decelerating the pusher and the debris 36 continues traveling inwardly.

The spring system 42 decelerates the pusher 3 and then accelerates the pusher towards the wall 45. The system 42 should be such that the pusher 3 is stopped about a quarter-centimeter from the wall 45 when the crash-load strikes the debris assembly.

When the crash-load strikes the debris assembly much debris strike the different pushers with velocities upwards of a hundred meters per second. By being a quarter-centimeter from the wall 45, the pushers can "give" that quarter-centimeter before the pusher is "pushed" into the wall 45 by the momentum of that debris.

Most of the pusher 3 and the wall 45 are manufactured of non-ferromagnetic material which has great toughness. A non-ferromagnetic "stainless" steel would be a preferred material; however, the first "pusher" crash-load capturing satellite could be constructed mostly of aluminum alloy most of which is scrap from spent rockets and empty fuel tanks even though there will be more erosion of such aluminum alloy.

The operator of this embodiment should so program the pushers 3 so that there is a desired debris assembly along the center-line at the instant the crash-load enters the entryway. The powerful electromagnets 48 are so programmed that desired quantities of debris are in each pusher 3. Note that when the debris 36 is moving towards the center-line with a velocity of say a half-meter per second, it strikes mostly non-ferromagnetic particles that have velocities on the order of magnitude of a centimeter per second and hence most such particles will also be moved towards the center-line without much misdirection of the debris 36 itself.

With crash-loads of about 200 kg from Earth and of about 460 kg of lunar material, there could be on the order of 800 tonnes of debris within the chamber of which about 200 tonnes are located within a meter of the center-line at the instant of crashing. However, about 600 tonnes of debris are within 3 meters of the center-line. Because of the pushing of almost stationary debris towards the center-line, there could be as little as a hundred tonnes of debris at the most "held" within pushers 3 just prior to the energizing of the coils 44 and still there could be the desired concentration of debris assembly along the center-line to interact with the crash-load.

FIG. 4 shows in greater detail the end of the chamber 11 near the entryway 4, the inner portion of the entryway 4, as well as adjacent structures. The bumper-doors 17 are shown closed tight to absorb the momentum-shock of the mass of debris and crash-load remains that strike them. Rough calculations indicate that such momentum-shock consists of about a couple tonnes of matter with an average velocity of about 200 meters per second striking those bumper-doors within a period of about 0.005 second.

There are four bumper-doors 17 which are shown fitting together. The angle of the center-line 51 of the chamber 11 and the center-line 53 of the bumper-door preferably 17 is about 20°. Correspondingly, the angle of the inside surface of the bumper-doors 17 with the center-line 51 preferably is about 70°. There is a beveled surface 54 of the door 17 with a length of about a quarter-meter such that the beveled surfaces of each of the four doors 17 all fit together when the doors 17 are fully extended.

When the entryway 4 is open for crash-loads of lunar material, the front surface 55 of the doors 17 are pulled back a couple of meters to about the line 56. The doors 16 are within the recesses 58 between bumpers 59. When shut, the doors 16 are vapor tight and the door moving and sealing means are not shown for such art is well developed.

When the great mass of high velocity debris strikes the surfaces 55, the doors 17 generally will be moved backwards and some debris will travel outwardly and strike the inner entryway bumpers 59 and the doors 16 which are strong enough to remain vapor tight. There is also a bumper-wall 61 which is strong enough to withstand much high velocity debris and to direct much of such debris through the opening-passageway 63 into collecting chamber 64 adjacent doors 17. A plurality of struts 66 which strengthen a front protecting wall 45.

Attached to chamber 64 is schematically shown gathering means 67 which collects up debris and gases from chamber 64. One way gathering means 67 function is by maintaining an almost perfect vacuum within so that when it opens up into chamber 64, gases and/or vapors that are within the chamber 11 will travel through opening-passageway 63 into chamber 64 and into gathering means 67. Entrapped within such gases and vapors will be much debris-dust. Within gathering means 67, solid particles are separated from the gases and vapors which are transferred to gas and vapor processing means 69. Collected gases and vapors from vapor processing means 69 are transferred to storage means 70. Likewise solid materials from gathering means 67 are transferred to solid processing means 71 wherein the different materials are separated from each other and then mostly transferred to storage means 70. Some of the lin which has been separated from other solid materials could be re-introduced into the chamber 11.

Means 67, 69, 70, 71, and power source and power distribution means 73 are located in various locations between the wall 45 and the outer wall 12 of the satellite 1.

The structure of the door 17 is shown generally in FIG. 4A and includes a great plurality of struts 75 within the large void within the door 17. A wall 79 of the door 17 near corner 76 is much thicker than wall 80 near the point 77 which is in the center of the outer curvature of the door 17. Between the wall 79 and wall 80 is a main strut 81.

It should be understood that satellite 1 has additional facilities, such as complex radar, control means, living quarters and work facilities, which are not shown in FIG. 1 or FIG. 4.

The quantity of vapors and gases produced with crashings within the chamber 11 depends upon the nature of the crash-loads and of the material within the debris assemblies. Means 67 and 69 are shown in FIG. 4 and smaller vapor and gas removing means 83 are shown positioned both entryways 4 and 14 (FIG. 1) for the capture of such gases and vapors that escape from chamber 11.

The "tub" embodiment of this invention is shown in FIG. 5 and is designed to capture crash-cargoes from Earth that contain volatile materials and/or cold liquids or solids. If recoverable, water is found in the polar regions of the Moon perhaps there will be such crash-loads of mostly water therefrom. Referring now to FIG. 5, a plurality of smaller vapor and gas removing means 83 are illustrated at to the entryways 4 and 14. Note that in FIG. 5 that for corresponding items the same numbers are used as in FIG. 1. For example, chamber 11, entryways 4 and 14, doors 16, 17, 20, and 21, and shutters 18 and 22.

The chamber 11 is somewhat elliptical with a major diameter of about 30 meters and a minor diameter of about 20 meters. Within this chamber 11, there is a net downward force of about 0.1 newtons per kilogram of mass (about a centi-gravity) due to the fact that the lower assemblage 5 is attached by a vertical tether 87 to an upper satellite portion 89 and is about 25 km below the system's center of gravity. A particle will "free fall" 20 meters in about 20 seconds and then have a downward velocity of about a meter per second. Thus, about half a minute after a crashing most of the debris will have settled into a large tub 6 which is located at the bottom of the chamber 11.

Some materials will have traveled with the gases and vapors produced upon crashing into a plurality of lower vapor and gas removing means 84 and upper vapor and gas removing means 85. The solid materials entering into means 84 are gathered together and transferred to the material processing means 88 wherein and wherefrom selected materials are transferred to storage means 70 and to dropping means 90 wherefrom such solid material is dropped in such a programmed way that it is within the debris assembly 13 at the instant crash-loads are crashing.

Processing means 85 includes systems for gathering and processing gases and liquids from the chamber 11 and collecting, separating and storing such gases and liquids and transferring such gases and liquids to a storage facility which can be included within storage.

Crash-load 92 is shown in FIG. 5 about to enter the entryway 4 and the shutters 18, and the doors 16 and 17 are shown open while the doors 20 and 21, and the shutters 22 at the opposite end of the chamber 11 are sealed shut. Also shown in entryway 4 is a temporary thin membrane-shutter 93 and two such shutters 93 are shown in entryway 14.

In order that most of the debris fall into the tub 6, the walls 45 of the chamber 11 are so shaped with a rim-ledge 95. For the capture of terrestrial ellipsoidals, there is located beneath the ledge 95 on the entryway 4 end of the chamber 11 an ellipsoidal catching means 96 which casts out an ellipsoidal catching net 97 about five seconds after terrestrial crash-load crashing. Means 96 will also process much debris which is not of ellipsoidal and in that function it will act somewhat like means 88.

In the practice of this tub embodiment of this present invention, there is more mass of debris within the chamber 11 (upwards of two thousand tonnes) and the crash-loads are more than twice as massive. Likewise, there could be three ellipsoidals of about 20 kg each with a terrestrial crash-load. Such ellipsoidals might each contain as much as 10 kg of very compressed and dehydrated "food". Such "food" is at a cryogenic temperature as is most of the crash-load which could be ammonia-ice when the crashing occurs. Hence the food itself would not excessively heated by the crashing.

FIG. 6 shows the tub 6, wherein there is shown a dotted line 99 showing where the debris is generally positioned within tub 6 before the tub is accelerated upwardly. If the electro-magnetic system as illustrated in FIG. 6 is used for moving the tub 6 then the tub 6, the walls 45, and the upper portion of the supports 7 should be non-ferromagnetic while the lower portion of the supports 7 shown as portion 100 should be ferromagnetic. Like the operation of the pushers 2, when the coils 44 are energized, the tub is moved upwardly. Also, to decelerate the upward moving tub 6, there are means 42 which cause the tub 6 to stop moving upwardly before it would hit the ledge 95 and cause it to be moved downwardly so that at the instant of crashing it is about a half-centimeter above the walls 45 into which it is designed to "fit".

FIG. 7 shows the location of the ten supports 7 which support and move the tub 6. A projection of the debris 13 when it rests within the tub is shown as a dotted line 99. These supports 7 must move in unison and with proper acceleration so that the debris assembly 13 is along the center-line of the chamber 11 when the crash-load arrives.

This tub embodiment could be so modified by using a plurality of tubs and pushers without deviating from the broad inventive principles of this embodiment or of this invention. Likewise the debris assembly could consist of a slurry and/or there could be the use of electromagnets as disclosed in the "pusher" embodiment.

FIG. 8 shows an orbital transport vehicle 8 of this invention wherein there is no net downward force and the debris assembly 113 contains much lin. Shown is a crash-load 9 about to impact with the debris assembly 113 outer shutters 107 and the inner shutter-doors 108 are open. To protect the vehicle 8 from an error in the crash-load's trajectory there are sturdy bumpers 105 and the outer shell 110 of the OTV 8 is greatly strengthened in the vicinity of the bumpers 105.

Before the crash-load 9 travels through the narrow entryway 104 of the OTV 8, it travels through a long and complex centering means 102 which consists of a plurality of coils and many struts.

At the far extremity of means 102 is a bumper means 105 which is designed to deflect any crash-load 9 that is traveling on a trajectory that is too far from the center-line C.L. of the means 102 that is an extension of the center-line C.L. of OTV 8. This bumper means is so designed that it partly crumbles and fragments in a manner such that no major pieces freely escape with high velocity into portions of the means 102.

With this type of design and construction there needs to be a major repair made when and if the bumpers 105 are struck by a crash-load. The reason for having replacement bumper portions quickly available and for being able to quickly complete needed repairs is that the long complex structure of struts and coils that comprise the means 102 does not have enough strength to withstand a direct blow by a whole crash-load.

With proper operation of this crashportation systems, the probability of an accident is so remote that it is more logical to replace a damaged bumper portion rather than make the whole complex structure and bumper massive enough so that it is strong enough to withstand a direct impact of a crash-load without damage.

In addition, there could be a rocket missile means (not shown) that would be fired to intercept and so fragmentize the errand crash-load such that no major damage occurs to the means 102 or to the body of the OTV 8. The outer shell 110 of the OTV 8, which is likely to be struck by debris from such fragmentized crash-loads, is made thicker and tougher than portions of the outer shell which is not in danger of being struck.

The chamber 111 of the OTV 8 is somewhat ellipsoidal in shape with a major diameter (along the center-line C.L.) of about 14 meters and a minor diameter of about 7 meters. The crash-load 9 impacts into the debris assembly 113 which is formed along the center-line by magnetic forces produced when intense currents travel through the coils 114, 116, and 117. Coils 114 and 116 are on ribs 118 that hold and support them. Hence, the outer surface of those coils that faces the center-line C.L. are about half a meter closer to that center-line than are the chamber's strong and sturdy walls 120.

In front of and attached to the OTV 8 is the over a hundred meter long means 102 which is flimsy, fragile, and yet strong enough to support a plurality of centering coils. A couple of meters from the bumpers 105 is the outermost coil 122 which has an inside diameter of on the order of two meters. About four meters further inward is coil 123 with an inside diameter that is about seven centimeters less than the inside diameter of coil 122.

About 3.8 meters inward of col 123 is coil 124 which has an inside diameter that is 6.5 cm less than the inside diameter of coil 123. Inward of coil 124 there is a plurality of coils 125 which become progressively closer to each other and each coil has a progressively slightly smaller inside diameters. For example, the innermost col 127 of means 102, which has an inside diameter of 80 cm, is about 1.7 meters from its outsideward neighboring coil 126, which has an inside diameter of about 81 centimeters.

Not shown on means 102 are the electrical current transmission means, current switching means and the crash-load sensing means. The passage of a most intensive pulse of current through the coils at a programmed time causes the crash load's center of gravity to be moved towards the center-line C.L. and also causes the center-line of the crash load to tend to become parallel to the center-line C.L. If the crash-load has a relative velocity of about 3 km/second relative to the OTV 8, it travels about 60 cm in a fifth of a milli-second. Hence, the practitioner of this invention should design things so that the high voltages and currents that could be induced in nearby conductors or conducting materials do not cause damage.

The outermost coil 129 of the entryway 104 has an inside diameter of about 79 cm and is outside of the outer shutters 107. About half a meter inside of the shutters 107 is the injector means 128 which injects crash-assembly pieces into the entryway 104. Such pieces are spheroids with an inner core of about 3 cm diameter that is of lin or iron. Surrounding the inner core is a very thick shell with a thickness of about 5 cm and of aluminum alloy.

When the debris assembly is first assembled in the first OTV of this design, the initial debris assembly could consist of about sixty tonnes of such spheroids. It is possible by having currents through the coils 114, 116, 117 and 134 at different programmed times to cause the spheroids of the debris assembly to be slightly scattered away from the center-line and to be somewhat spread out from the center portion of the chamber 111.

After the debris assembly has impacted with crash-loads, there will be fragments of lin mixed with non-ferromagnetic lunar materials, etc. When a spheroid is struck by a crash-load with a relative velocity of about 3,100 meters per second, a portion of that spheroid will be melted. The melted aluminum alloy of that spheroid would most probably be splattered into small molten pieces by further impactations. Such molten pieces could then conglomerate with fragments of lin and non-ferromagnetic lunar materials.

If the means of the crash-load of lunar materials is about 300 kg and no matter escapes or is withdrawn from the chamber 111 after about two hundred crash-load captures, the mass of "free" materials within the chamber 111 about doubles. Most of the fragments which are ferromagnetic will be within and about the debris assembly while most of the wholly non-ferromagnetic particles will mostly tend to be very weakly adhering to the walls 120.

After several hundred crash-load captures, the withdrawal of materials from the chamber 111 should begin because it is desired that the items making up the debris assembly be mostly of non-ferromagnetic matter but yet contain enough ferromagnetic matter that each item be moveable by magnetic forces. That is the operation of this embodiment should be such that the whole debris assembly does not magnetically adhere to itself. For example, when intense currents are programmed only through the coil 134, which is located about the innermost portion of entryway 104, it is desired that the debris assembly does not move as a solid-like mass toward the coil 134. If the debris assembly is mostly of ferromagnetic materials, then the whole assembly would move as a solid-like mass toward the coil 134 because in such a magnetic field each item itself becomes as a separate magnet and hence all such items attach themselves to neighboring items.

Hence, it is desired to separate out from the debris assembly those fragments which are of mostly ferromagnetic materials. That could be done by first having a most intensive current only in coil 114 and hence a majority of the fragments which are mostly of ferromagnetic material are moved to the outer central portion of the chamber 111. Then the current through coil 114 is turned off and intense current is programmed only through coil 134. Those fragments in the outer portion of the outer central portion of the chamber 111, which are mostly of ferromagnetic material, will be moved at high velocity towards the entryway 106.

Thus, fragments which are of mostly ferromagnetic material will be moved into the outermost portion of chamber 111. Then the current through coil 134 is turned off and intense currents are programmed through the coils 135 which are located about entryway 104 and about 3 and 5 meters outward of coil 134.

Hence, those fragments, which are more ferromagnetic, are moved selectively to locations along the center-line C.L. that are between the coils 135.

When the currents are turned off in coils 135, such fragments are captured by the ferromagnetic capturing means 139 and withdrawn from the entryway 104. Means 139 includes at least one powerful electromagnet and from means 139 such captured ferromagnetic material is transferred either to the material storage means 141 or to the spheroid production means 130.

By turning coils on and off, it is possible in the gravityless environment to cause the debris to be formed into a desired debris assembly. Note that much the same effect can be had by so regulating the current through different coils so that there is somewhat a constant magnetic field over the whole length along which it is desired to have the debris assembly form.

Additional spheroids for the debris assembly, which are produced in the means 130 are injected into the entryway 106 by the injector 128. By programming the currents through the coils 132, 135, and 134 it is possible to have the spheroids enter the chamber 111 with a velocity of one to two meters per second.

A plurality of deflecting electromagnets 133 could be so programmed that the spheroids miss the outer end of the debris assembly and travel towards the inner end and a side of the chain-sleeve 138. If spheroids strike the debris assembly, there is a resulting dispersion of some of the spheroids, particles, and fragments forming the outer end of the debris assembly.

By the programmed use of currents through the coils 134, 114, 116, and 117; and by the use of impacting spheroids, it is possible to form the debris assembly into a desired configuration at the instant of crash-load impactation. Thusly when currents travel through the coils 114 and 116, which are about two meters apart, the debris assembly forms along the center-line C.L. with the greater concentration of material having a length of about six and a half meters and an average thickness of about a meter and a quarter. There is another coil, coil 117, which is about two and a half meters further inward from coil 118 and current through coil 117 causes some of the debris assembly to extend to about half a meter from the shield 136.

The shield 136 is a solid shield, somewhat roundly shaped and slightly concave towards the chamber's center, with a maximum thickness, that is through its center, of about 0.4 meters and an average radius of about 0.8 meters. Since the shield 136 is constructed of purified lin, it has the properties of good armor-plate and is most ferromagnetic. Hence, when the currents travel through the coils 114, 116, and/or 117, the shield is pulled by magnetic forces towards the debris assembly. There are a great plurality of chains attached to shield 136 (only four are shown) by very strong links. For example, the links 137 attached to the shield are longer than half a meter and have a mass in excess of 100 kg.

There are six chains 140 attached to shield 136 which are pulled taught so that the shield does not move too close to the debris assembly when currents travel through coils 114, 116, and/or 117. About a quarter second before the crash-load impactation the chains 140 and other chains are released by such chain control means as means 142 and hence additional links could be impactation-pulled into the chamber. Thusly the length of the chains 140 is increased about a half meter before the avalanche causes movement of the shield 136 to a location shown as 136A is stopped as the means 142 cause the chains 140 to again be taught, as shown as 140A.

Since the shield is attached by a plurality of strong chains to the chain-sleeve 138, the whole chain-sleeve system is pulled towards the closed end of the chamber. Also, some debris strikes inner chain links such as link 137 and that adds to the forces pulling the whole shield and chain-sleeve system. In addition, chains 144 which are attached to chain control means 146, chains 148 that are attached to chain control means 150, etc., are released Just prior to impactation and then made taught.

After the effects of the impactation have subsided, the shield and chain-sleeve system is moved back into somewhat its prior location by being pulled by the great plurality of chains, such as chains 148, and by the passage of currents through the coils 134, 114, 116, and 117.

The innermost links of the chain-sleeve, such as links 151, are almost as strong and massive as links 137. Such links are about 10% iron and such iron is located in a plurality of centroidal portions of the links. Also the iron is all in the inside portions of the links such that at least 3 cm of aluminum alloy is between it and any outer surface. None of the middle and outer links of the chain-sleeve contain any ferromagnetic material for they are all constructed of aluminum alloy.

However, the inner links with their 10% iron content cause the whole chain-sleeve system to be moved towards the center-line C.L. and also cause the chain-sleeve system to become slightly compressed towards the chamber's center. But the great plurality of chains, such as chains 144, are made taught and prevent the whole chain-sleeve system from collapsing towards the center-line.

To each link of the chain-sleeve system, three or four links are attached and the resulting mass of the chain-sleeve system is on the order of a hundred tonnes. Most of the material of the chains of the chain-sleeve and of the other chains is of aluminum alloy which could come from scrap shuttle fuel tanks, expended rockets, etc.

Not shown in FIG. 8 are the many other systems needed to make the OTV operational such as radar and communication systems, living quarters, and storage volumes or cargo tie-one systems for the great volumes and masses of cargoes carried and for the crash-load materials accumulated.

If there are any gases or vapors produced within the chamber 111 such are withdrawn by the matter withdrawal means 152 which also includes powerful electromagnet means. Such withdrawn materials are then processed in either the gas processing and storage means 154 or in the material processing means 156 from whence such material is sent to the ferromagnetic material storage facility 157 or to the non-ferromagnetic material storage facility 158.

It is expected that this OTV will mostly be used for the transport of materials and supplies from low Earth orbit to higher Earth orbiting space stations or to much higher Earth orbiting space stations (such as geostationary), in such trips the total cargoes could be ten to twenty times the mass of the OTV 8 itself. To return to lower Earth orbit from much higher Earth orbits, the OTV could capture retrograde crash-loads of lunar materials that have but a fraction of the mass of prograde crash-loads.

Such retrograde crash-loads will have relative velocities that are three to six times the relative velocities that prograde crash-loads have. Hence with such retrograde crash-load captures, there needs to be more powerful centering means and there will be some vaporization of materials from the crash-load and debris assembly. However, it is expected that most such vapor will quickly condense upon nearby particles and result in different aggregated particles.

From higher low Earth orbits, such as 1,400 km altitude, to a lower low Earth orbit, some 1,100 km lower, there could be the capture of crash-loads from the Earth. If the practitioner desires to have such crash-loads contain much plastic or hydrocarbon material then there would need to be a more complex and larger means 154.

If this OTV does not receive crash-loads that decompose into much vapor or gas, there will be the need to have a collecting-cleaning means 160 which has a hatch 161 through which personnel and/or robotized equipment enters the chamber 111. Such personnel and/or robotized equipment collects materials from the walls 120 which are then processed in processing means 162. Separated materials from means 162 can be transferred to spheroid manufacturing facility 130 or to a material storage facility 141.

Also through the hatch 161 personnel and/or robotized equipment can enter the chamber 111 to repair chain links, to add additional links or chains, and to remove items and make adjustments, etc.

FIG. 9 shows a vertical cross-section along the center-line of the crash-load 9 which is largely schematic and is of lunar material to be captured by OTV 8. With a length of about 3 meters and a maximum diameter of about half a meter crash-load 9 has a mass of about 300 kg. Depending upon the desired materials available from lunar soil the crash-load 9 is constructed of such material and lin in a manner that its center-line becomes parallel to the center-line C.L. of the center-line coils and that its center-line is moved ever closer to the center-line C.L. by the centering forces from the magnetic coils. Also the crash-load 9 is so constructed that it most readily fragments into a great plurality of pieces many of which tend to move away from the center-line C.L.

The bowl-shaped front 168, the ring-shaped hollow 170, and the bowl-shaped rear 172 are such that the fore-mass 174 so fragments. The fore-mass 174 is connected to a like shaped middle-mass 176 by three shafts 175. The middle-mass 176 is connected by similar shafts 175, which are rotated about 60° about the crash-load's center-line, to a back-mass 178 that also has a similar shape.

The back-mass 178 is connected by four shafts 179 to the rear-most mass 180 which has somewhat a half-ellipsoidal shape that has been cut along its major axis. The crash-load 9 is strong enough so that it can withstand the forces of acceleration needed to propel it into the desired trajectory but yet so weak that it readily fragmentizes upon impactation. It is so designed that the fore-mass 174 fragmentizes about a tenth of a millisecond before the middle-mass 176 fragmentizes. Likewise, the back-mass 178 fragmentizes about at tenth of a millisecond after the middle-mass 176 and almost a millisecond before the rear-most mass 180 fragmentizes. Thus, there is a period of about three tenths of a millisecond during which the crash-load fragmentizes and transfers most of its momentum to the debris assembly 113.

This OTV 8 could be slightly changed and be used as a very low Earth orbiting crash-load capturing satellite that is attached to a very large scoop that travels through the uppermost portions of the atmosphere and- /or through the lowermost portions of the ionosphere. Such a scoop would capture about four times as much nitrogen gas as oxygen gas as well as some nitrogen oxides, argon, and eroded "dust" from the materials of the scoop itself. Such a scoop-crash-load-capturing-satellite that captures only crash-loads of lunar materials would be operated in a mode where the prograde momentum of such crash-load captures is balanced by the atmospheric drag of the scoop system which could have a variable and adjustable cross-sectional areas.

FIG. 10 shows a vertical cross-section, somewhat schematic, of chain link 151 which is an inside link in the chain-sleeve 138 shown in FIG. 8. Link 151 has a maximum length of about 60 cm, a maximum width of about 22 cm, and a maximum thickness of about 10 cm. The maximum thickness T of a portion of a link 151 is about 9 cm.

Link 151 is attached to links 182, 184, 186, and 187 cross-sections of which are shown. Links 182 and 184 are like link 151 and are inside links that are positioned longitudinally in the inside layer of the chain-sleeve 138. They both have cores 185 of ferromagnetic material. Also like link 151, most of the solid volume of the links 182 and 184 are of aluminum alloy 183.

All of links 186 and 187 are of aluminum alloy and they have a different shape than links 151, 182, and 184, since link 186 is connected to an adjacent link of link 151, said adjacent link is similar to link 151 and also to a link in the middle layer of chain-sleeve 138. Similarly, link 187 is connected to another adjacent link and another link in the middle layer.

Links 151 have a great plurality of portions 190 which like the cores 185 are of ferromagnetic material. Each portion 190 has a maximum linear dimension which does not exceed 6 cm and is never closer than one centimeter to an adjacent portion 190. Also the distance of a portion 190 to the outside surface, as shown by distance 192, is never less than 3 cm, while the distance of a portion 190 to an inside surface, as shown by distance 194, is never less than 2 cm.

There are links in the chain-sleeve 138 that have still different shapes and dimensions than the links 151, 182, 184, 186, or 187. And there is a great flexibility of design possible for a successful chain-sleeve. Having some three layers of chains which are connected to each other by links like links 186 and 187 could be used in this chain-sleeve 138 for use in chamber 111 of OTV 8.

The inventive innovations of crash-load centering by magnetic forces, by forming and positioning debris assemblies by magnetic forces, of the very large chain-sleeve, and of the massive shield with chains of this embodiment could be used in different crash-load capturing satellites or in combinations of such systems other than the specific system as disclosed herein as OTV 8.

Also many of the other inventive innovations disclosed in this invention could be slightly modified and used in conjunction with other innovations without departing from the spirit and scope of this invention. For example, the tub, as disclosed in the "tub" embodiment, and the pusher, as disclosed in the "pusher" embodiment, could be used in conjunctions with globs, which were disclosed in the aforementioned application Ser. No. 588,711, in a complex "braking" system not unlike the first embodiment of that Application.

It will be readily apparent from the foregoing Specification that other modifications may be made by the artisan to the embodiments of this invention and that the foregoing descriptions are illustrative of this invention's embodiments and do not depart from the spirit and scope of this invention.

I claim:

1. The method of receiving cargo with a mass of excess of 10 kg in an impact chamber of an extraterrestrial receiving facility, said impact chamber has a volume in excess of five cubic meters and said cargo has traveled a path of more than 10 km through space which has an average mass density of less than 1 gram per cubic meter, said cargo travels with a relative velocity to said impact chamber of more than 500 meters per second through an opening of said impact chamber that is aligned with the path of said cargo, said method includes positioning loose materials within said impact chamber to interact with said cargo, and said method also includes the positioning of sturdy movable configuration means which are attached to the wall of said impact chamber and said means interact with said loose materials and said cargo, as a result of such interactions the relative velocity of said cargo to said impact chamber is reduced to zero and there is negligible damage to said configuration means and to the wall of said impact chamber, the mass of said loose materials is more than a hundred times the mass of said cargo and the mass of said configuration means is more than ten time the mass of said cargo.

2. The method of claim 1 wherein said impact chamber includes catapulting means attached to its wall for positioning of said loose materials for interaction with said cargo.

3. The method of claim 2 wherein said impact chamber has microgravity and has attached to its wall a plurality of catapulting means, said catapulting means include electromagnet means which are activated to attract ferromagnetic loose material into said catapulting means and said electromagnet means are deactivated when said loose material is catapulted towards positioning for interaction with said cargo.

4. The method of claim 2 wherein there is an average net downward force in excess of a half milli-newton per kilogram of mass throughput said impact chamber and said catapulting means includes a large tub-shaped catapulting means along the bottom of said impact chamber.

5. The method of claim 1 wherein some of said loose material is ferromagnetic and positioning of said loose material includes the use of magnetic forces produced by the passage of electric currents through coils about said impact chamber.

6. The method of claim 1 wherein said cargo is somewhat ferromagnetic and the trajectory of said cargo is slightly altered towards a desired path near and within said receiving facility by the magnetic forces produced by the passage of programmed electric currents through a plurality of coils whose axis lies along the desired path to said opening of said impact chamber.

7. The method of claim 1 wherein said loose materials consist of particles of solid matter which are of different sizes and of different composition; and some of said particles are agglomerates of different materials.

8. The method of claim 1 wherein said cargo becomes fragmentized upon impact with said loose materials and becomes mixed with said loose materials and includes the step of separating out the mixture of fragmented cargo fragments and said loose materials for use in said impact chamber and for other uses.

9. The method of claim 7 wherein some of said agglomerates of different materials are manufactured extraterrestrially by combining together at least one piece of ferromagnetic material with at least one piece of non-ferromagnetic material.

10. The method of claim 8 wherein said cargo fragments include fluids, and includes the step of processing said cargo fragments.

11. The method of claim 1 wherein said receiving facility is located upon a natural or man-made satellite.

12. The method of claim 1 wherein said sturdy movable configuration means moves back and forth more than ten centimeters with each receipt of cargo, said configuration means includes bumper-doors or a massive shield connected to the wall of said impact chamber by a plurality of chains, or by both a massive shield connected to the wall of said chamber and by bumper-doors.

13. The method of claim 1 wherein said receiving facility is located upon a man-made satellite that is orbiting the Earth.

14. A method for transporting much cargo from an orbital location about the Earth which has an altitude above the Earth of less than 40,000 km to a different orbital location about the Earth which has an altitude above the Earth of less than 40,000 km; said method also includes the transportation of intransit received cargo from orbital locations about the Earth which have altitudes that are more than 300,000 km above the Earth to a different orbital location about the Earth which has an altitude above the Earth of less than 40,000 km; said method comprising the steps of:

attaching said much cargo to an orbital transportation facility, said much cargo has a mass on the order of or in excess of the mass of said orbital transportation facility;

propelling a series of crashloads toward said facility, said crashloads fragmentized into said intransit cargo when said crashloads are received by said facility;

directing each separate crashload of said series through an opening into an impact chamber of said facility, said crashload passes through said opening with a speed in excess of 1,000 meters per second, said impact chamber has a volume in excess of 5 cubic meters, the length of time between successive crashload passages through said opening is greater than 100 seconds, and all of said series of crashloads pass through said opening with a relative velocity that has somewhat the same direction;

positioning loose materials in said impact chamber;

so directing said crashload along a path into said impact chamber so that said crashload interacts with said loose materials such that said crashload is fragmentized and there is negligible damage to said impact chamber;

containing the fragments of said crashload and said loose materials in said impact chamber, said fragments include solids, and fluids, and said fragments are mixed by the interaction of said crashload and said loose materials;

withdrawing some of the mixture of loose materials and crashload fragments from said impact chamber;

processing the withdrawn mixture of loose materials and fragments into loose materials and into said intransit received cargo;

attaching said intransit received cargo that has been processed to said facility;

separating said much cargo from said facility and deliver said much cargo to a different orbital location; and separating said intransit received cargo from said facility and deliver said intransit received cargo to a different orbital location.

15. The method of claim 14 wherein some of said loose materials is ferromagnetic and the step of positioning loose materials within said impact chamber is aided by the programmed use of magnetic fields produced by the passage of currents through a plurality of coils which substantially surround said impact chamber.

16. Apparatus for receiving a cargo which has a mass greater than 10 kg and has traveled more than 10 km through space which has an average density that is less than one gram per cubic meter, said cargo has a relative velocity in excess of 500 meters per second as it travels through an opening of an extraterrestrial receiving facility and into an impact chamber which has a volume in excess of five cubic meters, said apparatus comprising:

means for directing said cargo along a path through said opening and into said impact chamber, said path is near or about the center-line of said impact chamber;

means for introducing loose materials into said impact chamber, the total mass of said loose materials is more than a hundred times the mass of said cargo;

means for positioning said loose materials in said impact chamber to impact with said cargo such that there is negligible damage to said impact chamber from the resulting impactation of said cargo with said loose materials, wherein said cargo is fragmentized and becomes mixed with said loose materials;

sturdy movable configuration means whose mass is more than ten times the mass of said cargo and is attached to the wall of said impact chamber, said configuration can move more than ten centimeters when it receives an impulse of more than 10,000 newton-seconds due to the receipt of an avalanche of loose materials and cargo fragments caused by said impactation, and the resulting damage to said configuration is negligible; and means for moving said movable configuration into position for receiving said avalanche.

17. Apparatus of claim 16 wherein said means for positioning said loose materials in said impact chamber is located within said impact chamber and comprises at least one device into which some said loose materials is gathered, such that when said device moves somewhat towards said path the gathered loose materials also moves somewhat towards said path; when said device stops moving and then starts moving back towards its prior location, said gathered loose materials continues moving somewhat towards said path; at the instant said cargo enters said impact chamber said device is near its said prior location and said gathered loose materials is positioned about said path, such that there is negligible damage from said impactation to said configuration, to said device and to said impact chamber.

18. The apparatus of claim 17 wherein there is an average net downward force throughout said impact chamber that is between 0.5 and 1,700 milli-newtons per kilogram of mass; said device includes large tub-shaped catapulting means along the bottom of said impact chamber with upward facing opening and moving support or supports.

19. The apparatus of claim 16 wherein said impact chamber is somewhat an ellipsoid with said opening at both ends of the major axis of said impact chamber, and wherein said configuration includes bumper-doors at each of the two ends along the major axis of said impact chamber; as said cargo enters said impact chamber along said path which is along or about said major axis there are open bumper-doors about said opening and closed bumper-doors at the other end of said impact chamber; after said impactation said closed bumper-doors help reduce the resulting damage from said avalanche to the closed end of said impact chamber to negligible.

20. The apparatus of claim 16 wherein said impact chamber is somewhat an ellipsoid with an opening at but one end of the major axis of said impact chamber, and wherein said configuration includes a massive shield which is attached to the wall of said impact chamber by a plurality of chains; said massive shield attenuates said avalanche and hence there is negligible damage to the closed end of said impact chamber from said avalanche.

21. The apparatus of claim 16 wherein the directing of said cargo along said path through said opening includes the use of a plurality of coils in front of said impact chamber through which currents are programmed so that the resulting magnetic fields cause said cargo which is somewhat ferromagnetic to be centered and aligned along said path.

22. The apparatus of claim 16 wherein said cargo consists of much substance which fragmentizes upon interaction with said material but also contains at least one ellipsoidally-shaped item with a volume in excess of 10 ml which retains its integrity.

23. The apparatus of claim 22 wherein said ellipsoidally-shaped item with a volume in excess of 10 ml has a thick tough outer shell which surrounds a special substance therein.

24. In a method for transporting a cargo from an orbital location about the Earth to a different orbital location about the Earth, said method comprising the steps of:
attaching cargo to a facility-satellite;
propelling crash-loads seriatum from a very high orbital location about the Earth along a path toward said facility-satellite, such that said crash-loads are received seriatum by said facility-satellite, and that all crash-loads are traveling in the same direction; and
producing a pseudo-gravitational field within said receiving facility;
directing said crash-load through an opening along a path in an impact chamber of said receiving facility;
providing particles of ferromagnetic material in said chamber;
inducing at least one magnetic field within said facility-satellite for positioning said particles in said path for interacting with said crash-load such that the relative velocity of said crash-load is reduced to zero without significant damage to said chamber; and
separating said attached cargo at a different orbital location.

25. The method of claim 24 wherein said step of inducing at least one magnetic field comprises using coils which substantially surround the impact chamber of said facility-satellite to position said particles of ferromagnetic material which are positioned along the path of said crash-loads by the magnetic fields produced when electric current passes through said coils, and wherein said crash-loads contain much ferromagnetic material and are so designed that said crash-load fragmentizes into many particles.

26. An extraterrestrial facility for receiving high velocity cargo and reducing the relative velocity of said cargo to zero without significant damage to said facility, said facility comprising:
a large impact chamber having an opening for receiving said cargo; and
means for introducing material into said impact chamber prior to the entry of said cargo for interacting with said cargo and in conjunction with at least one massive and backward moving shock-absorbing shield, bumper or door which is located towards or at the end of said impact chamber that is opposite to said opening.

27. The facility of claim 26 including a plurality of backward moving and shock-absorbing bumper-doors which absorb the momentum of some of said introduced material and some of said high velocity cargo such that there is insignificant damage to said facility and which help reduce the relative velocity of said cargo to zero.

28. The facility of claim 27 including a second pluralities of said bumper-doors, and wherein each plurality of said bumper-doors is at the opposite smaller ends of a somewhat ellipsoidally shaped impact chamber and when one of said plurality of said bumper-doors is open for the passage of high velocity cargo the other said plurality of bumper-doors is closed and absorbs said momentum.

29. The facility of claim 26 including a massive and backward moving bumper that acts as a shock-absorber that is located at the smaller end opposite said opening in said impact chamber which is ellipsoidally shaped.

30. The facility of claim 26 wherein said cargo is somewhat ferromagnetic and including apparatus for producing magnetic fields external of and in front of said opening for receiving said cargo such that said cargo is centered and aligned along a desired path into said impact chamber through said opening.

31. The facility of claim 26 including a massive shield chained to a very massive chain-sleeve all of which is chained to walls of said impact chamber, said shield, chain-sleeve, and connecting chains all acting as a shock-absorber in front of the chamber's end opposite said opening.

32. A method of causing the centering of a high velocity crash-load into a narrow entryway of a large impact chamber, said method comprising:
positioning a plurality of coils of progressively smaller diameters whose center is along an extension of the center-line of said large chamber; and
conducting programmed currents through said coils to produce magnetic forces upon ferromagnetic materials of said crash-load.

33. Apparatus for causing the centering of a high velocity crash-load into a narrow entryway of a large impact chamber, said apparatus comprising:
a plurality of coils of progressively smaller diameters whose center is along an extension of the center-line of said large chamber; and
means for conducting programmed currents through said coils to produce magnetic forces upon ferromagnetic materials of said crash-load.

34. Apparatus for containing crash-loads in a large chamber without damage to the outer walls or to the far inner end of said chamber by the use of a massive shield located at the end of a massive chain-sleeve, said shield being attached to said chain-sleeve by a plurality of chain-links and said shield and said chain-sleeve being attached to said wall by a plurality of chains.

35. Apparatus as in claim 34 wherein said chain-sleeve and said shield are positioned by the use of magnetic forces produced by programmed current traveling through coils circling the outer portions of said chamber and by the movement of chains attached to said wall.

36. Apparatus which consists of a plurality of external coils and means for programming currents through said coils which are in front of a desired opening into an impact chamber such that a high velocity cargo which is somewhat ferromagnetic is centered and aligned into a desired path through said opening.

* * * * *